T. DOYLE.
CHEESE HOOP FOLLOWER.
APPLICATION FILED NOV. 1, 1921.
1,436,339.
Patented Nov. 21, 1922.
2 SHEETS—SHEET 2.
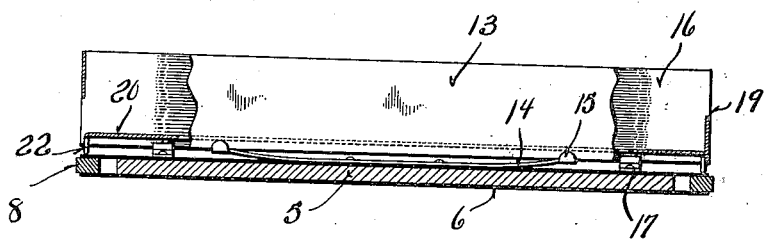
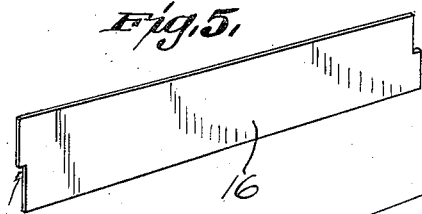
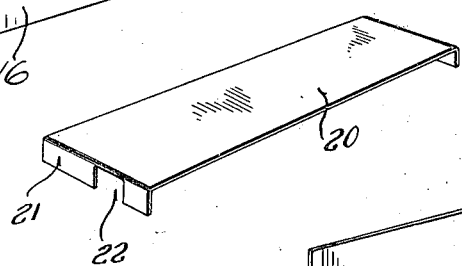
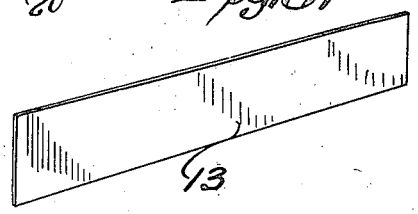
Witness:
Robert E. Weber
Inventor:
Thomas Doyle
By Young & Young
Attorneys Patented Nov. 21, 1922.

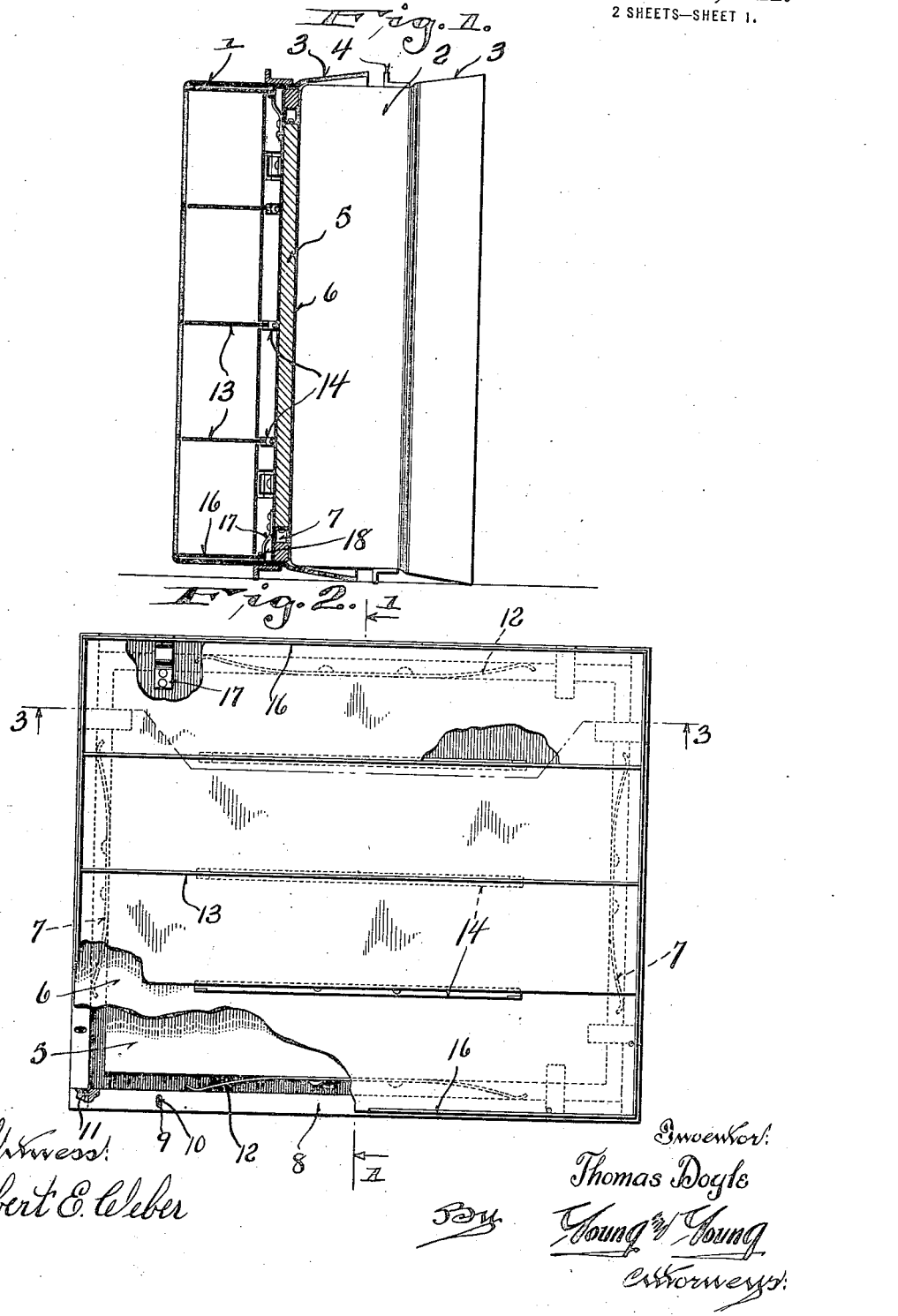

1,436,339

UNITED STATES PATENT OFFICE.

THOMAS DOYLE, OF CATO, WISCONSIN.

CHEESE-HOOP FOLLOWER.

Application filed November 1, 1921. Serial No. 511,989.

*To all whom it may concern:*

Be it known that I, THOMAS DOYLE, a citizen of the United States, and resident of Cato, in the county of Manitowoc and State of Wisconsin, have invented certain new and useful Improvements in Cheese-Hoop Followers; and I do hereby declare that the following is a full, clear, and exact description thereof.

My invention relates to a new and improved follower for cheese hoops which is especially adapted for use in preparing cheeses in the form of small bricks.

In manufacturing cheeses for certain classes of trade it is desirable to furnish the same in small bricks of predetermined size or weight which may be put up in cartons.

It has been found impracticable to press these cheeses individually, owing to the considerable time and the consequent expense involved in the process. On the other hand where a large cheese is pressed and subsequently cut up into small bricks the freshly cut surface is left with the so-called mechanical holes which cause the cheese to rapidly dry out and a hard crust to be formed on the cut surface which renders the cheese undesirable for the best class of trade.

The object of my invention therefore is broadly, to provide a cheese hoop and follower by which a considerable number of bricks may be pressed simultaneously wherein suitable provision is made for dividing the bricks and simultaneously closing up the mechanical holes.

The invention consists in certain details of construction and combinations of parts which will be hereinafter described in connection with the accompanying drawings and subsequently claimed.

In the drawings:—

Figure 1 represents a longitudinal sectional view thru my improved cheese hoop and follower with a second hoop nested therein.

Figure 2 is a bottom plan view of my improved follower with parts broken away in order to better show the construction.

Figure 3 is a sectional view substantially on the line 3—3 of Figure 2, and

Figure 4 is a perspective view of a pressure plate used in connection with the follower.

Figure 5 is a detail perspective view of one of the divider plates, and

Figure 6 is a similar view of one of the end plates.

Referring specifically to the drawings, the hoops 1 and 2 in Figure 1 are shown nested together in the manner in which they are used, the outer end of each hoop being tapered as shown at 3. The hoops are each preferably provided with a flange 4 on which they may rest. The hoop and follower as illustrated are rectangular in shape but it will be understood that variations may be made in the shape and size thereof within the scope of the invention.

The follower comprises a plate which fits within the hoop and includes a filler 5 of wood or other suitable material, which is provided on each side with a metallic facing 6. The facings extend beyond the filler to provide the peripheral groove 7 in which a sectional rim 8 is slidably mounted, these sections being provided with slots 9 by which they are guided on the pins 10 extending between the facings. Thus the sectional rim provides a continuous edge around the follower, the corners being formed with overlapping mortises 11. The rim sections are urged outwardly by the leaf springs 12 which are secured to the follower. Dividers 13 extend downwardly from the follower and are resiliently supported by springs 14 which are clamped thereto as shown at 15. Plates 16 are also provided around the periphery of the follower and are held by the springs 17 which are clamped thereto as shown at 18, the plates being overlapped at the corners as shown at 19. Between the dividers are placed the individual pressure plates 20 which are provided with upturned ends 21 in order to maintain the same in spaced relation to the follower plate, the ends being recessed as shown at 22 to receive the springs 17.

From the foregoing description it will be seen that I have provided a follower having means to resiliently engage the sides of the hoop and with dividers for separating the cheese into bricks. It will be understood that in the operation of the follower the dividing plates are covered with cheese cloth which closes up the mechanical holes. Any desired number of separate bricks may therefore be pressed simultaneously and each brick will be a finished product equal to one which has been pressed individually.

While I have shown and described only one specific form in which a follower may be constructed to carry out the principles of my invention it will be understood that many modifications may be made therein, without departing from the scope of the invention as claimed.

I claim as my invention:—

1. A follower for a rectangular cheese hoop comprising a rectangular plate to substantially fit within the same and having a groove extending around its periphery, rim sections slidably mounted in the groove and having overlapping mortises at the corners, and springs urging the respective sections outwardly toward the walls of the hoop.

2. A follower for cheese hoops comprising a plate substantially fitting inside the hoop, and dividers resiliently connected with the plate and extending downwardly for dividing the cheese into bricks when the follower is pressed into the hoop.

3. A follower for cheese hoops comprising a plate substantially fitting inside the hoop, dividers resiliently connected with the plate and extending downwardly for dividing the cheese into bricks when the follower is pressed into the hoop and pressure members resiliently secured to the plate between the dividers to obtain an equal pressure on each brick.

In testimony that I claim the foregoing I have hereunto set my hand at Cato, in the county of Manitowoc and State of Wisconsin.

THOMAS DOYLE.